(12) United States Patent
Tsujimoto et al.

(10) Patent No.: US 9,145,475 B2
(45) Date of Patent: Sep. 29, 2015

(54) METHOD FOR PRODUCING RUBBER COMPOSITION

(71) Applicant: TOYO TIRE & RUBBER CO., LTD., Osaka-shi (JP)

(72) Inventors: Toshiya Tsujimoto, Osaka (JP); Ryotaro Arai, Osaka (JP); Kenta Hyodo, Samukawamachi (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 14 days.

(21) Appl. No.: 14/104,743

(22) Filed: Dec. 12, 2013

(65) Prior Publication Data

US 2014/0187669 A1  Jul. 3, 2014

(30) Foreign Application Priority Data

Dec. 27, 2012  (JP) ................................. 2012-285517

(51) Int. Cl.
| | | |
|---|---|---|
| *C08K 3/04* | (2006.01) | |
| *C08J 3/22* | (2006.01) | |
| *C08J 3/20* | (2006.01) | |

(52) U.S. Cl.
CPC .. *C08J 3/22* (2013.01); *C08J 3/203* (2013.01); *C08J 3/226* (2013.01); *C08J 2307/00* (2013.01); *C08J 2311/00* (2013.01)

(58) Field of Classification Search
CPC ............... C08J 3/203; C08J 3/22; C08J 3/226
USPC .................................. 523/351; 524/495, 496
See application file for complete search history.

(56) References Cited

FOREIGN PATENT DOCUMENTS

JP  2008-179717 A  8/2008

*Primary Examiner* — Edward Cain
(74) *Attorney, Agent, or Firm* — Law Office of Katsuhiro Arai

(57) ABSTRACT

A method for producing a rubber composition containing by weight 5 to 95 parts of natural rubber (NR), 95 to 5 parts of chloroprene rubber (CR), and 20 to 90 parts of carbon black (CB), using a kneading machine, includes a first step of producing a master batch (M1) containing NR and CB; a second step of producing a master batch (M2) containing CR and CB, and a third step of mixing the M1 and M2 with each other to produce a master batch (M3) containing NR, CR, and CB, wherein the amount of CB contained in the M2 is from 40 to 70% by weight relative to the total amount of CB in the rubber composition, and when the M2 is discharged from the kneading machine after the second step, the actually measured temperature of the rubber composition is from 100 to 130° C.

13 Claims, 1 Drawing Sheet

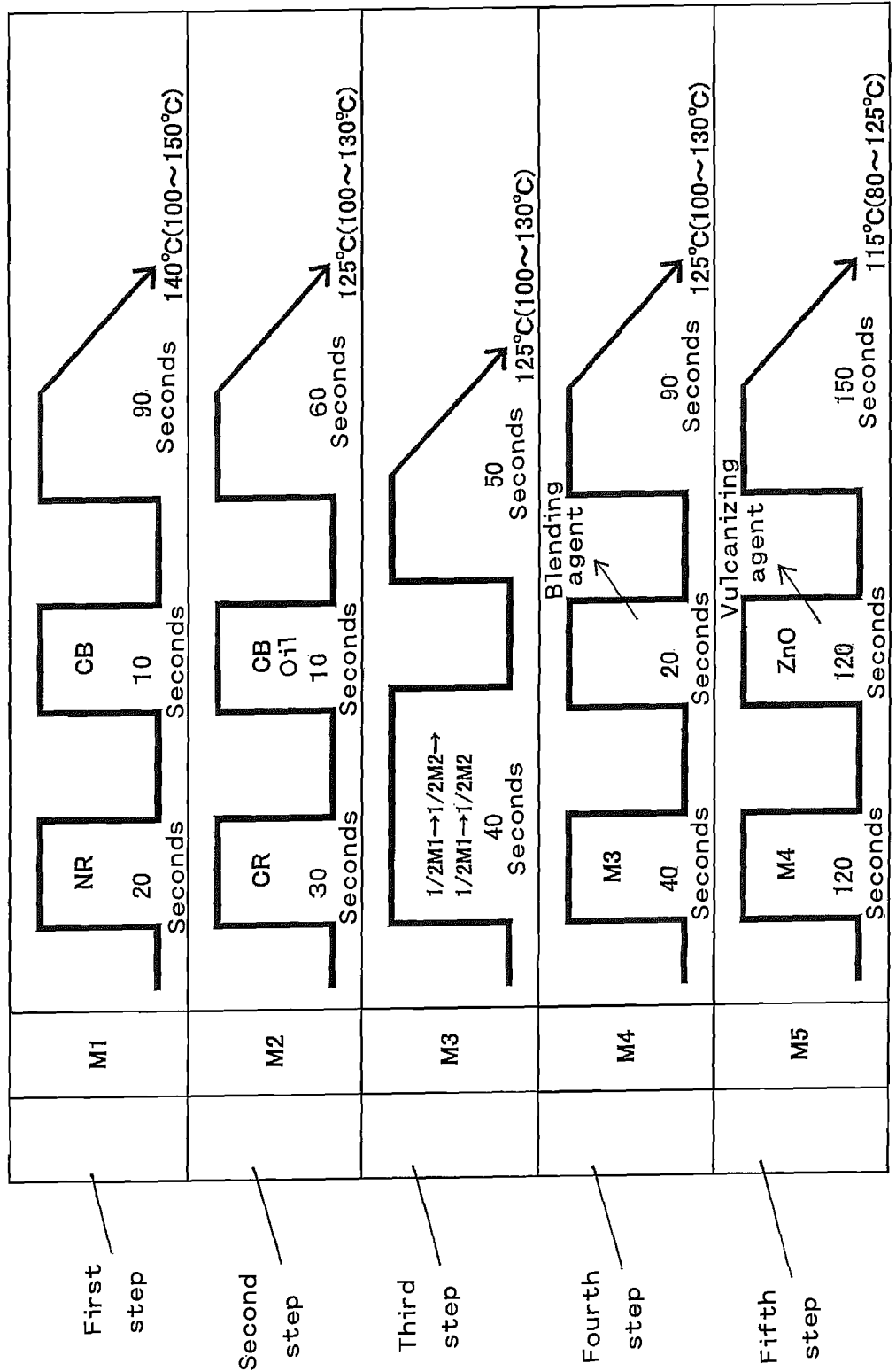

METHOD FOR PRODUCING RUBBER COMPOSITION

BACKGROUND OF THE INVENTION

1. Field of the Invention

The present invention relates to a method for producing a rubber composition containing natural rubber (NR), chloroprene rubber (CR) and carbon black (CB), using a kneading machine.

2. Description of the Related Art

Hitherto, in order to attain the vulcanization and the reinforcement of a rubber, an improvement in the function thereof, and the like, a rubber composition has been used in which sulfur, a filler and various chemicals are added to a rubber component. In general, however, powdery are many of sulfur, fillers such as carbon black and silica, and various chemicals such as zinc oxide and an anti-ageing agent. Thus, when these components are blended with a rubber component and the blend is kneaded, these components become into dust to be scattered, so as to cause, for example, problems that a weighing precision thereof is declined and the working environment is deteriorated. About, in particular, the fillers such as carbon black and silica, the ratio of the use amount thereof to that of the rubber component is large. Thus, when the fillers are blended into the rubber composition, it is important to blend the fillers with the rubber component as precisely as possible while the working environment is kept good.

As a method for solving this problem, there is known a technique of blending only a filler beforehand with a rubber component to prepare a master batch. JP-A-2008-179717 describes a technique of using natural rubber or styrene butadiene rubber as a binder component, and blending carbon black with this component to prepare a master batch.

However, the technique described in JP-A-2008-179717 discloses only a technique of making a specific rubber species, such as natural rubber or styrene butadiene rubber, into a master batch. Thus, JP-A-2008-179717 neither describes nor suggests that a master batch technique is used for a rubber composition in which natural rubber and chloroprene rubber are together used, so as to improve carbon black in dispersibility in this composition.

SUMMARY OF THE INVENTION

In light of the above-mentioned actual situation, the present invention has been made, and an object thereof is to provide a method for producing a rubber composition, in which natural rubber and chloroprene rubber are together used, that is capable of improving the dispersibility of carbon black in the composition and further preventing, when the composition is made into a vulcanized rubber, the generation of a foreign substance on the external surface of the rubber.

As far as the present inventors know, about any method for producing a rubber composition containing two or more rubber components, at least one of the components being chloroprene rubber, no technique of making both of chloroprene rubber and carbon black beforehand into a master batch has been reported. The present inventors have made eager investigations to find out that about a method for producing a rubber composition wherein natural rubber and chloroprene rubber are together used, by making chloroprene rubber and carbon black beforehand into a master batch while conditions for the production are satisfactorily created, and then kneading this batch with another master batch containing natural rubber and carbon black, the above-mentioned problem can be solved. The present invention is based on this finding. Accordingly, the present invention is as follows:

A method for producing a rubber composition containing 5 to 95 parts by weight of natural rubber (NR), 95 to 5 parts by weight of chloroprene rubber (CR) and 20 to 90 parts by weight of carbon black (CB), using a kneading machine, including a first step of producing a master batch (M1) containing NR and CB; a second step of producing a master batch (M2) containing CR and CB, and a third step of kneading the M1 and M2 with each other to produce a master batch (M3) containing NR, CR and CB; wherein when the total amount of CB in the rubber composition is regarded as 100% by weight, the amount of CB contained in the M2 is from 40 to 70% by weight, and when the M2 is discharged from the kneading machine after the second step, the actually measured temperature of the rubber composition is from 100 to 130° C.

At the time of producing a rubber composition containing NR, CR and CB (referred to also as the "NR/CR/CB based rubber composition" hereinafter), the present invention has the first step of producing a master batch (M1) containing NR and CB, the second step of producing a master batch (M2) containing CR and CB, and the third step of kneading the M1 and M2 with each other. By not only making NR and CB into a master batch but also making CR and CB into another master batch, and then mixing these batches with each other, a sea-island structure between rubbers and carbon black can be made uniform when the M1 and the M2 are kneaded with each other. Finally, the dispersion state of CB in the NR/CR/CB based rubber composition can be made good.

Although CR is a rubber, CR has resinoid properties. In the actual circumstances, no technique of making CR and CB into a master batch has been reported. However, the present inventors have made eager investigations to find out that when a NR/CR/CB based rubber composition containing 20 to 90 parts by weight of carbon black, a master batch (M2) wherein the dispersion state of CB is good can be produced by performing the following (1) and (2):

(1) When the total amount of CB in the rubber composition is regarded as 100% by weight, the amount of CB contained in the M2 is adjusted into the range of 40 to 70% by weight.

(2) When the M2 is discharged from the kneading machine after the second step, the actually measured temperature of the rubber composition is adjusted into the range of 100 to 130° C.

By the use of the master batch (M2), which is produced under the above-mentioned conditions (1) and (2) to be good in the dispersion state of CB in the batch, an NR/CR/CB based rubber composition wherein the dispersion state of CB is finally good can be produced.

In the method for producing a rubber composition, it is preferred that the third step is a step of performing: a first stage of charging, into the kneading machine, either one of the two that are approximately a half of the amount of the M1, and approximately a half of that of the M2, and next charging the other into the kneading machine; and a second stage of charging, into the kneading machine, either one of the two that are the remaining substantial half of that of the M1, and the remaining substantial half of that of the M2, and next charging the other into the kneading machine, thereby kneading the charged components with one another to produce the master match (M3) containing NR, CR and CB.

In general, at the time of producing an NR/CR/CB based rubber composition, A-kneading is performed, wherein CB is charged into NR and CR, blending agents other than zinc oxide and any vulcanizing agent are charged thereinto and then the charged components are kneaded with one another to produce an A-kneaded material, and then B-kneading is performed, wherein zinc agent and a vulcanizing agent are kneaded with the A-kneaded material, thereby producing the NR/CR/CB based rubber composition. However, results of the investigations made by the present inventors have demonstrated that only by performing the A-kneading and the B-kneading, CB in the rubber composition is deteriorated in dispersibility. However, according to the present invention, CB in an NR/CR/CB based rubber composition can be remarkably improved in dispersibility when the rubber composition is produced by making not only NR and CB but also CR and CB into respective master batches, and further performing the following two stages when the master batches are charged into a kneading machine: a first stage of charging, into the kneading machine, either one of the two that are approximately a half of the amount of the M1, and approximately a half of that of the M2, and next charging the other into the kneading machine; and a second stage of charging, into the kneading machine, either one of the two that are the remaining substantial half of that of the M1, and the remaining substantial half of that of the M2, and next charging the other into the kneading machine.

In the method for producing a rubber composition, the third step may be specifically any one of modes (i) to (iv) described below. Each of the modes makes it possible to produce an NR/CR/CB based rubber composition wherein CB is remarkably improved in dispersibility.

(i) The third step is a step of charging, into the kneading machine, approximately a half of the amount of the M1, approximately a half of that of the M2, the remaining substantial half of that of the M1, and the remaining substantial half of that of the M2 in this order, and then kneading the charged components to produce the master match (M3) containing NR, CR and CB.

(ii) The third step is a step of charging, into the kneading machine, approximately a half of the amount of the M2, approximately a half of that of the M1, the remaining substantial half of that of the M2, and the remaining substantial half of that of the M1 in this order, and then kneading the charged components to produce the master match (M3) containing NR, CR and CB.

(iii) The third step is a step of charging, into the kneading machine, approximately a half of the amount of the M1, approximately a half of that of the M2, the remaining substantial half of that of the M2, and the remaining substantial half of that of the M1 in this order, and then kneading the charged components to produce the master match (M3) containing NR, CR and CB.

(iv) The third step is a step of charging, into the kneading machine, approximately a half of the amount of the M2, approximately a half of that of the M1, the remaining substantial half of that of the M1, and the remaining substantial half of that of the M2 in this order, and then kneading the charged components to produce the master match (M3) containing NR, CR and CB.

It is preferred that the method for producing a rubber composition further includes, after the third step, a fourth step of kneading a blending agent other than zinc oxide and any vulcanizing agent with the M3 to produce an M4 containing the blending agent other than zinc oxide and any vulcanizing agent, and the M3. By the kneading (A-kneading) of the blending agent other than zinc oxide and any vulcanizing agent with the master batch M3, which contains NR, CR and CB to be improved in the dispersibility of CB in this batch, the blending agent other than zinc oxide and any vulcanizing agent is also improved in dispersibility.

It is preferred that the method for producing a rubber composition further includes, after the fourth step, a fifth step of kneading zinc oxide and a vulcanizing agent with the M4 to produce the rubber composition. By the kneading (B-kneading) of zinc oxide and the vulcanizing agent with the M4, wherein CB is improved in dispersibility, zinc oxide and the vulcanizing agent are also improved in dispersibility.

BRIEF DESCRIPTION OF THE DRAWING

FIG. 1 is a schematic view illustrating a mixing procedure in each step in a case of using a closed kneading machine.

DETAILED DESCRIPTION OF THE PREFERRED EMBODIMENTS

The present invention relates to a method for producing a rubber composition containing 5 to 95 parts by weight of natural rubber (NR), 95 to 5 parts by weight of chloroprene rubber (CR) and 20 to 90 parts by weight of carbon black (CB), using a kneading machine.

In the present invention, the kneading machine may be, for example, a closed kneading machine such as a gear intermix-type mixer, a tangential Banbury type mixer or a pressurized kneader, or an open roll. In the present invention, through the entire process for producing a rubber composition, the same kneading machine (for example, a Banbury type mixer) may be used. Alternatively, partially in this process, a different kneading machine (for example, a pressurized kneader) may be used.

About each of NR and CR, a resin in any grade known by those skilled in the art is usable. The ratio between the amount of NR and that of CR is variable in accordance with the use manner of a vulcanized rubber to be finally obtained. However, in order to make the dispersibility of CB better, the amount of NR and that of CR in the rubber composition are set preferably into 10 to 90 parts by weight and 90 to 10 parts by weight, respectively, and more preferably into 20 to 80 parts by weight and 80 to 20 parts by weight, respectively, Usable carbon black is, for example, SAF, ISAF, HAF, FET, GPF, or SRF. These may be used alone or in the form of a blend of two or more thereof. Carbon black is usable as far as the amount thereof is within a range permitting the adjustability of rubber properties obtained when the rubber composition is vulcanized, such as the hardness, the reinforceability, and low heat generation performance of the rubber composition. The blending amount of carbon black is preferably from 20 to 90 parts by weight, more preferably from 25 to 60 parts by weight based on 100 parts by weight of the rubber components. If this blending amount is less than 20 parts by weight, the rubber composition may not achieve a sufficient reinforcing effect of carbon black. If the amount is more than 90 parts by weight, the composition may be deteriorated in heat generation performance, miscibility of the rubbers therein, workability upon processing, and the like.

In connection with a relationship between CB and CR, at the time of regarding the total amount of CB in the rubber composition as 100% by weight, the amount of CB contained in the master batch (M2), which contains CR and CB, is set into the range of 40 to 70% by weight. In this way, a sea-island structure between CR and CB is made evener, so that CB in the rubber composition is improved in dispersibility.

The method for producing a rubber composition according to the present invention has a feature having the first step of producing a master batch (M1) containing NR and CB; the second step of producing a master batch (M2) containing CR and CB, and the third step of kneading the M1 and M2 with each other to produce a master batch (M3) containing NR, CR and CB.

Hereinafter, a description will be made about one example of embodiments according to the present invention, based on an example in which a closed kneading machine (for example, a tangential Banbury type mixer) is used as the kneading machine.

First Step:

As illustrated in FIG. 1, in the first step, a master batch (M1) containing NR and CB is produced. In this step of producing the M1, for example, NR is charged into a closed kneading machine, and then roughly kneaded for about 15 to 40 seconds (20 seconds in the present embodiment); next, CB is charged thereinto, kneaded for about 5 to 40 seconds (10 seconds in the present embodiment), and further kneaded for 60 to 180 seconds (90 seconds in the present embodiment); and when the actually measured temperature of the rubber composition of the M1 reaches a temperature of 100 to 150° C. (140° C. in the present embodiment), the M1 is discharged from the closed kneading machine.

Second Step:

In the second step, the closed kneading machine is used to produce a master batch (M2) containing CR and CB. In this step of producing the M2, for example, CR is charged into the closed kneading machine, and then roughly kneaded for about 20 to 60 seconds (30 seconds in the present embodiment); next, CB is charged thereinto, and then oil and the like are optionally charged thereinto, kneaded for about 5 to 30 seconds (10 seconds in the present embodiment), and further kneaded for 30 to 120 seconds (60 seconds in the present embodiment); and when the actually measured temperature of the rubber composition of the M2 reaches a temperature of 100 to 130° C. (125° C. in the present embodiment), the M2 is discharged from the closed kneading machine. In the discharge, by the adjustment of the actually measured temperature of the rubber composition of the M2 into the range of 100 to 130° C., CB is improved in dispersibility in the rubber composition to be finally obtained.

Third Step:

In the third step, the M1 and the M2 are mixed with each other to produce a master batch (M3) containing NR, CR and CB. In the present invention, the third step is preferably a step of performing: a first stage of charging, into the kneading machine, either one of the two that are approximately a half of the amount of the M1, and approximately a half of that of the M2, and next charging the other into the kneading machine; and a second stage of charging, into the kneading machine, either one of the two that are the remaining substantial half of that of the M1, and the remaining substantial half of that of the M2, and next charging the other into the kneading machine, thereby kneading these charged components with one another to produce the master match (M3) containing NR, CR and CB. In the present invention, the wording "approximately a half" or "substantial half" means 40 to 60% by weight of the total amount, in particular, 45 to 55% by weight thereof, and more restrictedly 50% by weight thereof.

In the third step, preferably, at the first and second stages, approximately halves of the amount of the M1, and approximately halves of that of the M2 are successively charged into the closed kneading machine by four operations in total, then kneaded for about 30 to 60 seconds (40 seconds in the present embodiment), and further kneaded for about 30 to 120 seconds (50 seconds in the present embodiment); and when the actually measured temperature of the rubber composition of the M3 containing NR, CR and CB reaches a temperature of 100 to 130° C. (125° C. in the present embodiment), the M3 is discharged from the closed kneading machine.

The third step may be more specifically any one of the following modes (i) to (iv):

(i) A step of charging, into the kneading machine, approximately a half of the amount of the M1, approximately a half of that of the M2, the remaining substantial half of that of the M1, and the remaining substantial half of that of the M2 in this order, and then kneading the charged components to produce the master match (M3) containing NR, CR and CB. In FIG. 1, the mode (i) is illustrated.

(ii) A step of charging, into the kneading machine, approximately a half of the amount of the M2, approximately a half of that of the M1, the remaining substantial half of that of the M2, and the remaining substantial half of that of the M1 in this order, and then kneading the charged components to produce the master match (M3) containing NR, CR and CB.

(iii) A step of charging, into the kneading machine, approximately a half of the amount of the M1, approximately a half of that of the M2, the remaining substantial half of that of the M2, and the remaining substantial half of that of the M1 in this order, and then kneading the charged components to produce the master match (M3) containing NR, CR and CB. In the mode (iii), it is allowable to charge, into the closed kneading machine, approximately halves of the amount of the M2 by continuous two operations, or charge, into the machine, the total amount of the M2 by one operation.

(iv) A step of charging, into the kneading machine, approximately a half of the amount of the M2, approximately a half of that of the M1, the remaining substantial half of that of the M1, and the remaining substantial half of that of the M2 in this order, and then kneading the charged components to produce the master match (M3) containing NR, CR and CB. In the mode (iv), it is allowable to charge, into the closed kneading machine, approximately halves of the amount of the M1 by continuous two operations, or charge, into the machine, the total amount of the M1 by one operation.

Fourth Step:

The method for producing a rubber composition according to the present invention may further include, after the third step, a fourth step of kneading a blending agent other than zinc oxide and any vulcanizing agent with the M3 to produce an M4 containing the blending agent other than zinc oxide and any vulcanizing agent, and the M3. As illustrated in FIG. 1, in the fourth step, for example, the M3 is charged into the closed kneading machine to be kneaded for about 30 to 60 seconds (40 seconds in the present embodiment); next, a blending agent other than zinc oxide and any vulcanizing agent is charged thereinto to be kneaded for about 10 to 40 seconds (20 seconds in the present embodiment), and further kneaded for about 60 to 120 seconds (90 seconds in the present embodiment); and when the discharge temperature of the M4 reaches a temperature of 100 to 130° C. (125° C. in the present embodiment), the M4 is discharged from the closed kneading machine.

The blending agent other than zinc oxide and any vulcanizing agent may be any blending agent known by those skilled in the art, examples thereof including silica, silane coupling agents, stearic acid, vulcanization retardants, anti-ageing agents, softeners such as waxes and oils, processing aids, and other blending agents usable ordinarily in the rubber industry, and may be blended into the rubber composition as far as the advantageous effects of the present invention are not impaired.

The anti-ageing agents may be anti-ageing agents usable ordinarily for rubbers, examples thereof including aromatic amine anti-ageing agents, amine/ketone anti-ageing agents, monophenolic anti-ageing agents, bisphenolic anti-ageing agents, polyphenolic anti-ageing agents, dithiocarbamate anti-ageing agents, and thiourea anti-ageing agents. These anti-ageing agents may be used alone or in the form of a mixture of two or more thereof.

Fifth Step:

The method for producing a rubber composition according to the present invention may optionally include, after the fourth step, a fifth step of kneading zinc oxide and a vulcanizing agent with the M4 to produce a rubber composition. As illustrated in FIG. 1, in the fifth step, for example, the M4 is charged into the closed kneading machine to be kneaded for about 100 to 140 seconds (120 seconds in the present embodiment); next, zinc oxide and a vulcanizing agent are charged thereinto to be kneaded for about 60 to 180 seconds (120 seconds in the present embodiment), and further kneaded for about 60 to 240 seconds (150 seconds in the present embodiment); and when the discharge temperature of M5 reaches a temperature of 80 to 125° C. (115° C. in the present embodiment), the M5 is discharged from the closed kneading machine.

Examples of the vulcanizing agent include a sulfur-based vulcanizing agent, a vulcanization promoter, and a vulcanization promoting aid. Sulfur as the sulfur-based vulcanizing agent may be ordinary sulfur for rubbers. Examples of usable sulfur include powdery sulfur, precipitated sulfur, insoluble sulfur, and highly dispersible sulfur. In the present invention, the content of sulfur in the rubber composition is appropriately variable in accordance with the use manner of the composition.

The vulcanization promoter may be a vulcanization promoter usable ordinarily for vulcanizing rubbers. Examples thereof include sulfenamide vulcanization promoters, thiuram vulcanization promoters, thiazole vulcanization promoters, thiourea vulcanization promoters, guanidine vulcanization promoters, and dithiocarbamate vulcanization promoters. These may be used alone or in the form of an appropriate mixture of two or more thereof.

A vulcanized rubber made of a rubber composition produced by the method for producing a rubber composition according to the present invention is excellent in dispersibility of CB therein, and further makes it possible to restrain effectively the generation of a foreign substance resulting from aggregates of CB on the external surface of the rubber. Accordingly, the rubber composition produced by the method for producing a rubber composition according to the present invention is preferably usable as, for example, a raw material for air springs used in railroad vehicles, in particular, a raw material for rubbery bellows (flexible members) provided over an upper plate attached to a main body of a railroad vehicle, and a lower plate arranged at the bottom body thereof below the main body. The rubber composition is also usable as bellows for cars (examples thereof including trucks and buses), car parts (boots used in a driving section), or parts for general industries (products whose rubber sheet is thin and whose external appearance quality is strictly required).

EXAMPLES

Hereinafter, the present invention will be more specifically described by way of Examples.

Preparation of Rubber Composition:

In each of Example 1, and Comparative Examples 1 to 4, a closed kneading machine was used to add, to 100 parts by weight of rubber components, individual components according to a blend formulation according to Table 1, so as to produce a rubber composition. About Example 1, a rubber composition was produced in accordance with the mixing procedure shown in FIG. 1. About Comparative Example 1, a rubber composition was produced in accordance with a conventional method (of performing: A-kneading of charging CB into NR and CR, charging thereinto blending agents other than zinc oxide and any vulcanizing agent, and then kneading them to produce an A-kneaded material; and B-kneading of kneading zinc oxide and a vulcanizing agent into the A-kneaded material). About each of Comparative Examples 2 and 3, a rubber composition was produced in the same way as in Example 1 except that the amount of CB contained in the M2 was changed. About Comparative Example 4, a rubber composition was produced in the same way as in Example 1 except that the period for kneading the M2 was made long to adjust the discharge temperature of the M2 to 135° C. when the M2 was discharged from the closed kneading machine. The individual blending agents described in Table 1 are as follows:

a) Rubber components

Natural rubber (NR): RSS#3

Chloroprene rubber (CR): "DENKA CHLOROPRENE DCR-38", manufactured by Denki Kagaku Kogyo K. K.

b) Carbon black: FEF ("SEEST SO", manufactured by Tokai Carbon Co., Ltd.)

c) Oil (aroma oil): "AROMAX #3", manufactured by Fuji Kosan Co., Ltd.

d) Stearic acid: "Stearic Acid for Industry", manufactured by Kao Corp.

e) Magnesium oxide: "KYOWA MAG #150", manufactured by Mitsui Mining & Smelting Co., Ltd.

f) Zinc oxide: "Zinc Oxide #3", manufactured by Kyowa Chemical Industry Co., Ltd.

g) Sulfur: "5%-Oil-Treated Sulfur", manufactured by Hosoi Chemical Industry Co., Ltd.

h) Anti-ageing agent: "ANTIGEN 6C", manufactured by Sumitomo Chemical Co., Ltd.

i) vulcanization promoter (TS): "NOCCELLER TS", manufactured by Ouchi Shinko Chemical Industrial Co., Ltd.

Evaluation:

The evaluation of each of the rubber compositions was made about a sample rubber obtained by heating and vulcanizing the rubber composition at 160° C. for 20 minutes, using a predetermined mold.

<Tensile Strength TB (MPa) and Elongation at Break EB (%)>

The tensile strength TB (MPa) and the elongation at break EB (%) of each of the sample rubbers were measured in accordance with JIS K 6251. The results are shown in Table 1.

<CB Dispersion Degree and Maximum Particle Diameter in Rubber>

A rubber sheet for evaluating physical properties of the rubber was punched out into a rubber thickness "t" of 2 mm, using a JIS-#3-dumbbell. A measuring device ("BUNSAN-KUN MARK IIIa", manufactured by Daihan Co., Ltd.) was used to measure a side face region of the sample rubber about the dispersion degree (%) and the maximum particle diameter of CB therein. It is demonstrated that as the dispersion degree (%) is higher, the dispersibility of CB is more excellent. The results are shown in Table 1.

TABLE 1

| Raw material name | | Maker Name | Example 1 | Comparative Example 1 | Comparative Example 2 | Comparative Example 3 | Comparative Example 4 |
|---|---|---|---|---|---|---|---|
| NR | RSS#3 | | 40 | 40 | 40 | 40 | 40 |
| CR | DENKA CHLOROPRENE DCR-38 | Denki Kagaku Kogyo K.K. | 60 | 60 | 60 | 60 | 60 |
| CB | SEEST SO (FEF) | Tokai Carbon Co., Ltd. | — | 30 | — | — | — |
| CB(M1) | | | 12 | — | 20 | 6 | 12 |
| CB(M2) | | | 18 | — | 10 | 24 | 18 |
| Oil (aroma oil) | AROMAX #3 | Fuji Kosan Co., Ltd. | 6 | 6 | 6 | 6 | 6 |
| Stearic acid | Stearic acid for industries | Kao Corp. | 2 | 2 | 2 | 2 | 2 |
| MgO | KYOWA MAG #150 | Mitsui Mining & Smelting Co., Ltd. | 4 | 4 | 4 | 4 | 4 |
| ZnO | Zinc oxide #3 | Kyowa Chemical Industry Co., Ltd. | 5 | 5 | 5 | 5 | 5 |
| S | 5%-Oil-treated sulfur | Hosoi Chemical Industry Co., Ltd. | 1.8 | 1.8 | 1.8 | 1.8 | 1.8 |
| Anti-ageing agent 6C | ANTIGEN 6C | Sumitomo Chemical Co., Ltd. | 6 | 6 | 6 | 6 | 6 |
| Promoter TS | NOCCELLER TS | Ouchi Shinko Chemical Industrial Co., Ltd. | 1 | 1 | 1 | 1 | 1 |
| Mixing procedure | | | FIG. 1 | A-kneading/ B-kneading | FIG. 1 | FIG. 1 | FIG. 1 |
| M2 discharge temperature | | | 125 | — | 125 | 125 | 135 |
| M3 discharge temperature | | | 125 | — | 125 | 125 | 125 |
| Dispersion degree (%) | | | 99.1 | 88 | 92 | 90 | 83 |
| Maximum particle diameter (μm) | | | 44.1 | 120 | 80 | 79 | 146 |
| TB (MPa) | | | 20 | 17 | 18 | 17 | 14 |
| EB (%) | | | 730 | 650 | 700 | 700 | 610 |

From the results in Table 1, it is understood that the vulcanized rubber yielded from a raw material that was the rubber composition produced by the producing method according to Example 1 was more excellent in CB dispersibility and external appearance property than the vulcanized rubber yielded from a raw material that was the rubber composition produced by the producing method according to Comparative Example 1. Since the former vulcanized rubber was excellent in CB dispersibility, it is also understood that this vulcanized rubber was excellent in both of TB and EB. However, about the vulcanized rubber yielded from a raw material that was the rubber composition produced by the producing method according to Comparative Example 2, wherein the CB content in the M2 was small, as well as about the vulcanized rubber yielded from a raw material that was the rubber composition produced by the producing method according to Comparative Example 3, wherein the CB content in the M2 was large, the CB dispersibility was deteriorated. Following this matter, these rubbers were deteriorated in both of TB and EB. Furthermore, about the vulcanized rubber yielded from a raw material that was the rubber composition produced by the producing method according to Comparative Example 4, the CB dispersibility was remarkably deteriorated since the actually measured temperature of the rubber composition of the M2 was too high. Following this matter, this rubber was largely deteriorated in both of TB and EB.

What is claimed is:

1. A method for producing a rubber composition containing 5 to 95 parts by weight of natural rubber (NR), 95 to 5 parts by weight of chloroprene rubber (CR) and 20 to 90 parts by weight of carbon black (CB), using a kneading machine, comprising a first step of producing a master batch (M1) containing NR and CB; a second step of producing a master batch (M2) containing CR and CB, and a third step of mixing the M1 and M2 with each other to produce a master batch (M3) containing NR, CR and CB; wherein when the total amount of CB in the rubber composition is regarded as 100% by weight, the amount of CB contained in the M2 is from 40 to 70% by weight, and
when the M2 is discharged from the kneading machine after the second step, the actually measured temperature of the rubber composition is from 100 to 130° C.

2. The method for producing a rubber composition according to claim 1, wherein the third step is a step of performing: a first stage of charging, into the kneading machine, either one of the two that are approximately a half of the amount of the M1, and approximately a half of that of the M2, and next charging the other into the kneading machine; and a second stage of charging, into the kneading machine, either one of the two that are the remaining substantial half of that of the M1, and the remaining substantial half of that of the M2, and next charging the other into the kneading machine, thereby kneading these charged components with one another to produce the master match (M3) containing NR, CR and CB.

3. The method for producing a rubber composition according to claim 1, wherein the third step is a step of charging, into the kneading machine, approximately a half of the amount of the M1, approximately a half of that of the M2, the remaining substantial half of that of the M1, and the remaining substantial half of that of the M2 in this order, and then kneading the charged components to produce the master match (M3) containing NR, CR and CB.

4. The method for producing a rubber composition according to claim 1, wherein the third step is a step of charging, into the kneading machine, approximately a half of the amount of the M2, approximately a half of that of the M1, the remaining substantial half of that of the M2, and the remaining substantial half of that of the M1 in this order, and then kneading the charged components to produce the master match (M3) containing NR, CR and CB.

5. The method for producing a rubber composition according to claim 1, wherein the third step is a step of charging, into the kneading machine, approximately a half of the amount of the M1, approximately a half of that of the M2, the remaining substantial half of that of the M2, and the remaining substantial half of that of the M1 in this order, and then kneading the charged components to produce the master match (M3) containing NR, CR and CB.

6. The method for producing a rubber composition according to claim 1, wherein the third step is a step of charging, into the kneading machine, approximately a half of the amount of the M2, approximately a half of that of the M1, the remaining substantial half of that of the M1, and the remaining substantial half of that of the M2 in this order, and then kneading the charged components to produce the master match (M3) containing NR, CR and CB.

7. The method for producing a rubber composition according to claim 1, further comprising, after the third step, a fourth step of kneading a blending agent other than zinc oxide and any vulcanizing agent with the M3 to produce an M4 containing the blending agent other than zinc oxide and any vulcanizing agent, and the M3.

8. The method for producing a rubber composition according to claim 7, further comprising, after the fourth step, a fifth step of kneading zinc oxide and a vulcanizing agent with the M4 to produce the rubber composition.

9. The method for producing a rubber composition according to claim 2, further comprising, after the third step, a fourth step of kneading a blending agent other than zinc oxide and any vulcanizing agent with the M3 to produce an M4 containing the blending agent other than zinc oxide and any vulcanizing agent, and the M3.

10. The method for producing a rubber composition according to claim 3, further comprising, after the third step, a fourth step of kneading a blending agent other than zinc oxide and any vulcanizing agent with the M3 to produce an M4 containing the blending agent other than zinc oxide and any vulcanizing agent, and the M3.

11. The method for producing a rubber composition according to claim 4, further comprising, after the third step, a fourth step of kneading a blending agent other than zinc oxide and any vulcanizing agent with the M3 to produce an M4 containing the blending agent other than zinc oxide and any vulcanizing agent, and the M3.

12. The method for producing a rubber composition according to claim 5, further comprising, after the third step, a fourth step of kneading a blending agent other than zinc oxide and any vulcanizing agent with the M3 to produce an M4 containing the blending agent other than zinc oxide and any vulcanizing agent, and the M3.

13. The method for producing a rubber composition according to claim 6, further comprising, after the third step, a fourth step of kneading a blending agent other than zinc oxide and any vulcanizing agent with the M3 to produce an M4 containing the blending agent other than zinc oxide and any vulcanizing agent, and the M3.

* * * * *